(12) United States Patent
Vincent et al.

(10) Patent No.: US 7,943,537 B2
(45) Date of Patent: May 17, 2011

(54) STRETCH LAMINATE MATERIAL AND METHODS OF MAKING SAME

(75) Inventors: Michael Vincent, Toronto (CA); John Roberts, Moncton (CA); Bhupinder Randhawa, Richmond Hill (CA); James Raakman, Burlington (CA)

(73) Assignee: Irving Personal Care Limited, Dieppe, New Brunswick (CA)

( * ) Notice: Subject to any disclaimer, the term of this patent is extended or adjusted under 35 U.S.C. 154(b) by 308 days.

(21) Appl. No.: 11/857,982

(22) Filed: Sep. 19, 2007

(65) Prior Publication Data

US 2008/0070007 A1 Mar. 20, 2008

Related U.S. Application Data (60) Provisional application No. 60/826,100, filed on Sep. 19, 2006.

(51) Int. Cl.
*D04H 1/00* (2006.01)
*D04H 13/00* (2006.01)
*D04H 3/00* (2006.01)

(52) U.S. Cl. ........ 442/328; 442/329; 442/381; 442/394; 428/192

(58) Field of Classification Search ........... 442/328, 442/394, 329, 381; 428/192
See application file for complete search history.

(56) References Cited

U.S. PATENT DOCUMENTS

| | | |
|---|---|---|
| 4,573,991 A | 3/1986 | Pieniak et al. |
| 4,578,070 A | 3/1986 | Holtman |
| 4,618,384 A | 10/1986 | Sabee |
| 4,639,949 A | 2/1987 | Ales et al. |
| 4,641,381 A | 2/1987 | Heran et al. |
| 4,857,067 A | 8/1989 | Wood et al. |
| 4,861,652 A * | 8/1989 | Lippert et al. ............... 428/152 |
| 4,880,682 A | 11/1989 | Hazelton et al. |
| 4,883,549 A | 11/1989 | Frost et al. |
| 4,886,853 A | 12/1989 | Foster et al. |
| 4,938,753 A | 7/1990 | Van Gompel et al. |
| 4,938,757 A | 7/1990 | Van Gompel et al. |
| 4,940,464 A | 7/1990 | Van Gompel et al. |
| 5,127,977 A | 7/1992 | Eaton et al. |
| 5,143,679 A | 9/1992 | Weber et al. |
| 5,156,793 A | 10/1992 | Buell et al. |
| 5,167,897 A | 12/1992 | Weber et al. |
| 5,274,023 A | 12/1993 | Takahashi et al. |
| 5,344,691 A | 9/1994 | Hanschen et al. |
| 5,354,597 A | 10/1994 | Capik et al. |
| 5,376,430 A | 12/1994 | Swenson et al. |
| 5,422,172 A | 6/1995 | Wu |
| 5,462,708 A | 10/1995 | Swenson et al. |
| 5,468,428 A | 11/1995 | Hanschen et al. |
| 5,472,775 A | 12/1995 | Obijeski et al. |
| 5,496,298 A | 3/1996 | Kuepper et al. |

(Continued)

FOREIGN PATENT DOCUMENTS

CA 2150366 4/1999

(Continued)

*Primary Examiner* — Norca L Torres-Velazquez
(74) *Attorney, Agent, or Firm* — Bereskin & Parr LLP/S.E.N.C.R.L., s.r.l.

(57) ABSTRACT

A stretch laminate comprises a carrier web extending lengthwise in a machine direction and widthwise in a cross direction between opposed side edges, the carrier web including an extensible zone and an inextensible zone disposed side-by-side across the width of the carrier web; and an elastomeric element laminated to the nonwoven layer over at least a portion of the extensible zone.

15 Claims, 6 Drawing Sheets

U.S. PATENT DOCUMENTS

| | | |
|---|---|---|
| 5,501,679 A | 3/1996 | Krueger et al. |
| 5,536,563 A | 7/1996 | Shah et al. |
| 5,576,090 A | 11/1996 | Suzuki |
| 5,620,780 A | 4/1997 | Krueger et al. |
| 5,635,290 A | 6/1997 | Stopper et al. |
| 5,674,216 A | 10/1997 | Buell et al. |
| 5,685,873 A | 11/1997 | Bruemmer |
| 5,700,255 A | 12/1997 | Curro et al. |
| 5,733,822 A | 3/1998 | Gessner et al. |
| 5,804,286 A | 9/1998 | Quantrille et al. |
| 5,807,368 A | 9/1998 | Helmer |
| 5,843,068 A | 12/1998 | Allen et al. |
| 5,853,881 A | 12/1998 | Estey et al. |
| 5,861,074 A | 1/1999 | Wu |
| 5,885,908 A | 3/1999 | Jaeger et al. |
| 5,916,663 A | 6/1999 | Chappell et al. |
| 5,921,973 A | 7/1999 | Newkirk et al. |
| 5,997,989 A | 12/1999 | Gessner et al. |
| 6,027,483 A | 2/2000 | Chappell et al. |
| 6,069,097 A | 5/2000 | Suzuki et al. |
| 6,159,584 A | 12/2000 | Eaton et al. |
| 6,187,425 B1 | 2/2001 | Bell et al. |
| 6,197,012 B1 | 3/2001 | Mishima et al. |
| 6,255,236 B1 * | 7/2001 | Cree et al. .................. 442/328 |
| 6,258,077 B1 | 7/2001 | Buell et al. |
| 6,270,910 B1 | 8/2001 | Jaeger et al. |
| 6,313,372 B1 | 11/2001 | Suzuki |
| 6,323,389 B1 | 11/2001 | Thomas et al. |
| 6,376,095 B1 | 4/2002 | Cheung et al. |
| 6,410,129 B2 | 6/2002 | Zhang et al. |
| 6,417,121 B1 | 7/2002 | Newkirk et al. |
| 6,417,122 B1 | 7/2002 | Newkirk et al. |
| 6,420,285 B1 | 7/2002 | Newkirk et al. |
| 6,448,355 B1 | 9/2002 | Knight et al. |
| 6,472,084 B1 | 10/2002 | Middlesworth et al. |
| 6,476,289 B1 | 11/2002 | Buell et al. |
| 6,500,540 B1 | 12/2002 | Langohr et al. |
| 6,506,698 B1 | 1/2003 | Quantrille et al. |
| 6,531,207 B1 | 3/2003 | Eaton et al. |
| 6,572,595 B1 | 6/2003 | Klemp et al. |
| 6,617,016 B2 | 9/2003 | Zhang et al. |
| 6,669,887 B2 | 12/2003 | Hilston et al. |
| 6,682,514 B1 | 1/2004 | Brunner |
| 6,702,795 B2 | 3/2004 | Klemp |
| 6,726,983 B2 | 4/2004 | Erdos et al. |
| 6,811,865 B2 | 11/2004 | Morman et al. |
| 6,821,915 B2 | 11/2004 | Morman et al. |
| 6,849,324 B2 | 2/2005 | Meece et al. |
| 6,878,647 B1 | 4/2005 | Rezai et al. |
| 6,890,630 B2 | 5/2005 | Franklin et al. |
| 6,939,334 B2 | 9/2005 | Odorzynski et al. |
| 6,994,761 B2 | 2/2006 | Klemp et al. |
| 7,015,155 B2 | 3/2006 | Zhou et al. |
| 7,029,545 B2 | 4/2006 | Suzuki |
| 7,048,991 B2 | 5/2006 | Franklin et al. |

FOREIGN PATENT DOCUMENTS

| | | |
|---|---|---|
| CA | 2168771 | 7/1999 |
| CA | 2141818 | 10/1999 |
| CA | 2159933 | 12/2000 |
| CA | 2176202 | 1/2001 |
| CA | 2129127 | 5/2001 |
| CA | 2075296 | 10/2001 |
| CA | 2159930 | 1/2005 |

* cited by examiner

STRETCH LAMINATE MATERIAL AND METHODS OF MAKING SAME

This application claims the benefit of Provisional Application No. 60/826,100, filed Sep. 19, 2006, which is incorporated herein by reference.

FIELD

The embodiments disclosed relate to several variants of a stretch laminate material and to methods of making such stretch laminate materials and to absorbent articles comprising a stretch laminate.

BACKGROUND

Absorbent articles such as diapers and training pants are desirably configured for fit wearers snugly and to conform to the shape of the wearers body while the wearer moves about. In recent years, such absorbent articles have included various elastic components to facilitate such conformation.

SUMMARY

The following summary is intended to introduce the reader to this specification but not to define any invention. In general, this specification discusses one or more methods or apparatuses related to stretch laminates, method of making stretch laminates, and articles such as diapers incorporating stretch laminates.

According to one aspect, a stretch laminate comprises a carrier web extending lengthwise in a machine (or longitudinal) direction and widthwise in a cross (or lateral) direction between opposed side edges, the carrier web including an extensible zone and an inextensible zone disposed side-by-side across the width of the carrier web; and an elastomeric element laminated to the nonwoven layer over at least a portion of the extensible zone.

In some embodiments, the carrier web comprises a non-woven layer carded in the machine direction at least in the extensible zone. In some embodiments, the nonwoven layer is also carded in the inextensible zone. The laminate can comprise a reinforcement applied to the carrier web in the inextensible zone. The reinforcement can comprise a reinforcing layer laminated to the inextensible zone of the carrier web. The reinforcement can comprise embossing applied to the inextensible zone of the carrier web.

According to another aspect, a diaper comprises a shell having a front waist end and a rear waist end and a crotch portion extending between the front and rear waist ends, the shell configured to hold an absorbent assembly against the crotch of a wearer, the shell including ears extending laterally outwardly from at least one of the front and rear waist ends, the ears comprising a stretch laminate, the stretch laminate comprising a carrier web extending lengthwise in a machine direction and widthwise in a cross direction between opposed side edges, the carrier web including an extensible zone and an inextensible zone disposed side-by-side across the width of the carrier web; and an elastomeric element laminated to the nonwoven layer over at least a portion of the extensible zone.

According to another aspect, a method making a stretch laminate having an elastic region and a non-elastic region comprises: providing a non-woven material carded in a machine direction; applying an elastic material in a first region of the non-woven material; and reinforcing a second region of the of the non-woven material, the second region overlapping a portion of the elastic material, the second region generally corresponding to the non-elastic region of the laminate and the first region non-overlapped by the second region generally corresponding to the elastic region. The stretch laminate is stretchable transversely of the machine direction in the elastic region and is substantially unstretchable in the non-elastic region.

In some embodiments, the non-elastic region is reinforced by applying a substantially non-stretchable film to the non-elastic region. The film and the elastic material can be bonded together in the overlap region. In some embodiments, the non-elastic region can be reinforced by embossing the non-elastic region. The non-elastic region can be reinforced by heating the non-elastic region to a temperature sufficient to at least partially melt at least some of the carded fibers in the non-elastic region. The elastic material can be applied to the non-woven material by bonding the elastic material to the non-woven material. The elastic material can be an elastic film applied to the non-woven material by bonding the elastic film to the non-woven material. The elastic film can be bonded to the non-woven material across substantially the entire surface of the elastic film. The elastic film can be bonded to the non-woven web with an adhesive. The elastic film can be bonded to the non-woven web with a stretchable adhesive. The elastic film can be intermittently bonded to the non-woven material with an adhesive. The elastic film can be point-bonded to the non-woven material. The elastic film can be extrusion-bonded to the non-woven material. The elastic material can be applied to the non-woven material by spraying the elastic material onto the non-woven material. The elastic material can be an elastic film applied to the non-woven material by forming the elastic film on the non-woven material.

According to another aspect, a method making a stretch laminate having an elastic region and a non-elastic region comprises: providing a non-woven material carded in a machine direction; applying an elastic material in a first region of the non-woven material corresponding to the elastic region; and reinforcing a second region of the of the non-woven material corresponding to the non-elastic region. The non-elastic region is spaced apart from the elastic region by gap region, and the stretch laminate is stretchable in the elastic region except for the gap region in a cross-direction that generally perpendicular to the machine direction and is substantially not stretchable in the non-elastic region.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

Figure 1:
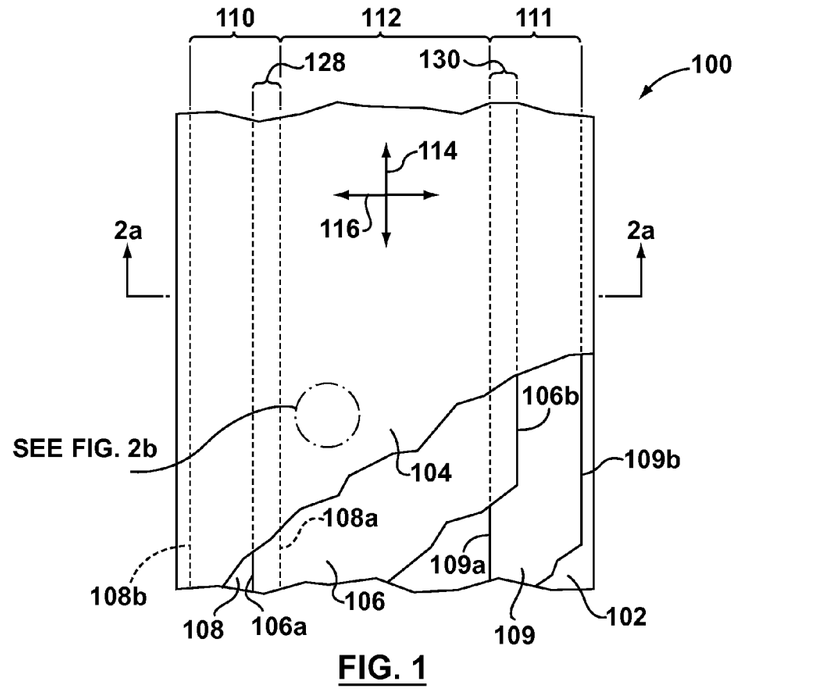
FIG. 1 is a top cut-away view of a first exemplary laminate material.

Reference is first made to FIG. 1, which illustrates a first exemplary stretch laminate material 100. Laminate material 100 includes first and second non-woven layers 102 and 104, an elastic element 106 and reinforcing elements 108 and 109.

Laminate 100 has a first non-elastic region 110, a second non-elastic region 111 and an elastic region 112. Laminate 100 is formed in a longitudinal direction (also called machine direction) 114 and elastic region 112 is stretchable and resilient across its width in a transverse direction (also called cross direction) 116. Elastic region 112 may also be stretchable in other directions, such as the machine direction 114 or any other direction at an angle to machine direction 114.

Figure 2A:
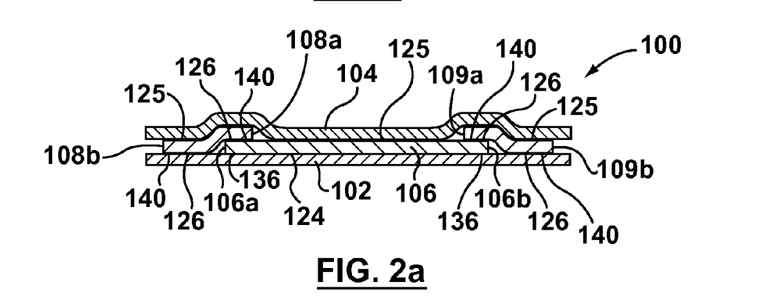
FIG. 2a is a cross-sectional view of the laminate material of FIG. 1 taken along the lines 2-2.
Figure 2B:
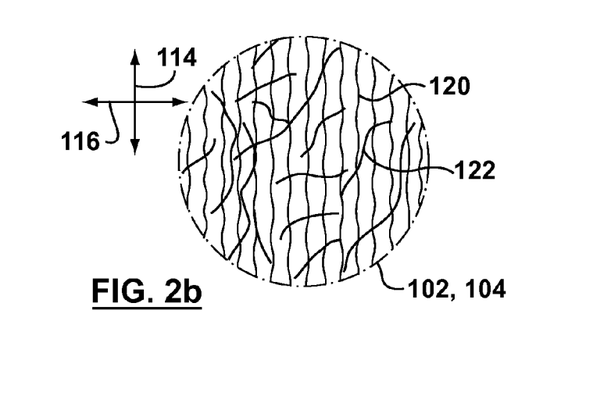
FIG. 2b is an enlarged view of a portion of the material of FIG. 1.

Referring now also to FIGS. 2a and 2b, first and second non-woven layers 102 and 104 are, in the example illustrated, formed of a carded non-woven material. Fibers 120 in the non-woven layers are generally oriented in the machine direction 114. The degree of carding may vary and the non-woven layers can also include fibers 122 oriented at an angle to the machine direction. In the example illustrated, the non-woven layers have much greater resistance to tension in the machine direction 114 than in the cross direction 116. The machine direction tensile strength can facilitate transporting webs of the non-woven layers 102 and 104 in the machine direction during processing. The weakened tensile strength in the cross-direction 116 can facilitate lateral straining (i.e. extension of the width) of the non-woven layers in the cross-direction when stressed laterally by a user, examples of which are provided hereinafter.

In the example illustrated, the non-woven layers 102 and 104 are carded generally uniformly across the width of the layers 102, 104, such that the non-woven layers 102, 104 have a generally uniform cross-directional strength across the width of the non-woven layers 102, 104. In other examples, the non-woven layers 102, 104 can be carded only in a laterally central region of the layers 102, 104, corresponding to where the elastic region 112 is provided in the laminate 100. Alternatively or additionally, the non-woven layers 102, 104 can have a central region that is carded to a greater extent than the marginal regions. Non-woven layers 102, 104 having cross-directionally weakened central portions and cross-directionally stronger side marginal portions can thus be provided. In other examples, providing cross-directional weakened non-woven layers 102, 104 can be effected by means other than carding, such as, for example, mechanically weakening a non-carded non-woven layer to reduce cross-directional strength thereof.

In the illustrated example of the laminate material 100, the elastic element 106 and reinforcing element 108 and 109 are sandwiched between the non-woven layers. The elastic elements 106 is, in the example illustrated, disposed in a generally lateral (or transverse) central portion of the laminate 100, and the reinforcing elements 108 and 109 are disposed adjacent respective sides of the elastic element 106. The elastic element 106 extends transversely between left and right lateral edges 106a, 106b, respectively. The reinforcing elements 108 and 109 each extend transversely between respective proximal and distal lateral edges 108a, 108b and 109a, 109b.

The elastic element 106 may be formed of any stretchable or elastic (elastic also generally referred to as elastomeric herein) sheet, film, scrim or other material that is flexible, stretchable and resilient. The elastic element is stretchable and resilient in at least the cross-direction, although it may also be stretchable and resilient in other directions. In one embodiment, the elastic element 106 is an elastomeric film. The elastomeric film is bonded to the first non-woven layer 102 with an adhesive 124 and to the second non-woven layer with an adhesive 125.

The reinforcing elements 108 and 109 are substantially non-stretchable in at least the cross direction 116. By "substantially" non-stretchable, it is meant that the reinforcing elements will be less than about 10% as stretchable as the elastic element 106 in the cross direction 116. The reinforcing elements 108, 109 may also be substantially non-stretchable in other directions, although they may optionally exhibit some stretchability in directions at an angle to the cross-direction. In this exemplary embodiment, the reinforcing elements 108, 109 comprise polyethylene films. In other embodiments, the reinforcing elements may be polypropylene films, plastic films, or other flexible, substantially non-stretchable sheets, films, scrims or other material.

The reinforcing elements 108 and 109 are, in the example illustrated, significantly stronger in the cross-direction 116 than are the non-woven layers 102 and 104. For example, the reinforcing elements 108, 109 can have a resistance to a cross-direction tensile force that is about two times, four times, or ten times (or more) greater than that of the non-woven layers 102, 104. This means that to obtain a particular unit of strain in the reinforcing layer 108, 109, a force of two times, four times, or ten times (or more) must be applied to the reinforcing layer 108, 109 as compared to the cross-direction force required to obtain the same unit of strain in the non-woven layers 102, 104.

The reinforcing elements 108 and 109 are bonded to the first non-woven layer 102 with an adhesive 126, which may be the same or a different adhesive than adhesive 124. In this embodiment, elastic element 106 extends beyond the longitudinally extending, cross-direction edges of elastic regions 112 into overlap regions 128, 130 within the non-elastic regions 110 and 111. In the overlap regions 128, 130, elastic element 106 overlaps and is bonded to reinforcement elements 108, 109 using adhesive 126. In another embodiment, a different adhesive may be used in the overlap regions 128 to adhere the reinforcement elements to the elastic element. For example, an adhesive that is particularly suited to bonding the materials from which those elements are formed may be used. Adhesive 126 adheres elastic element 106 and reinforcing element 108 such that they remain attached during use of the stretch laminate material 100, as is further described below.

The second non-woven layer 104 is bonded to the reinforcing elements 108 and 109 and to the elastic element 106 with adhesive 125. Optionally, different adhesives may be used to bond the second non-woven layer 104 to the reinforcing elements and to the elastic element. The laminate 100 in the illustrated example has an elastic region 112 generally corresponding to the central region comprising the elastic element 106 and free of the reinforcing elements 108, 109. While the carded non-woven layers 102, 104 may provide some resistance to a cross-direction force applied over the width of the laminate 100, due for example to some fiber bonding in the cross-direction, these bonds and/or fibers can easily be broken so that after a single, first cycle extension in the cross-direction, the central elasticizable region behaves as an elastic region, and from a user's experience, behaves similar to the behaviour of the laminate 100 prior to the first cycle extension.

The co-operation of the reinforcement elements 108, 109 and the non-woven layers 102, 104 generally provides a carrier web having a highly extensible central zone (generally corresponding to elastic zone 112), and relatively inextensible marginal zones on either side of the extensible central zone (generally corresponding to inelastic zones 110, 111). These relative measures of extensibility are considered in relation to forces that may be expected to be exerted by a caregiver when stretching a diaper around the waist of an infant. Such forces can be, for example, in the range of 100N or less. Under such forces, the highly extensible central zone is configured to extend to at least about 50%, and in some embodiments to 100%, 200%, or more of its original cross-directional extent. In some embodiments, such forces would be sufficient to sever the non-woven layers 102, 104, were it not for the elastic member 106 laminated thereto. In the embodiment illustrated, the elastic member 106 maintains the integrity of the laminate 100 in the central elastic zone 112, and provides resilient elasticity to the laminate 100. The reinforcement members 108, 109 maintain the integrity of the laminate 100 in the marginal regions 110, 111 and can facilitate providing a robust attachment zone for reliably securing the laminate 100 to other products, such as, for example, a diaper or other garment.

Other examples of a carrier web adapted to receive an elastic element laminated thereto and having a highly extensible central region and inextensible marginal regions can also be provided within the scope of the applicant's teaching. For example, a carrier web having a non-woven layer that is preferentially or only carded in the central region thereof can be provided. In such an example, the elastic member 106 can maintain the integrity of the laminate in the carded central region, and the marginal regions can be free of an additional reinforcing member since the less carded or non-carded marginal regions can generally possess sufficient cross-directional strength to maintain integrity of the laminate and in some example to provide robust attachment zones.

Figure 3:
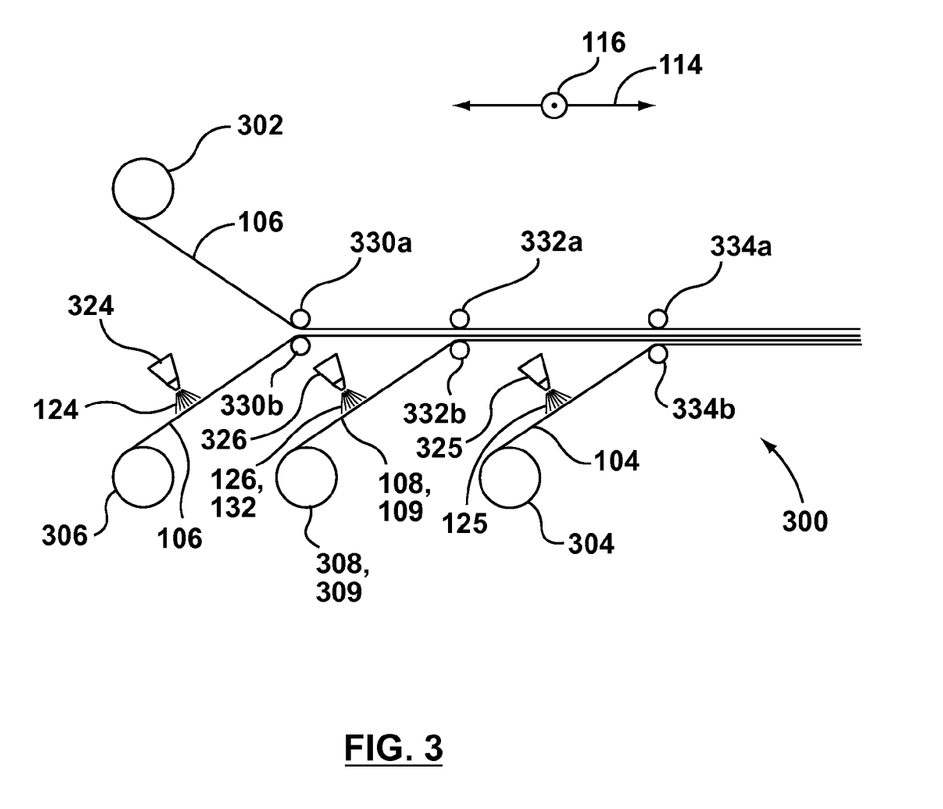
FIG. 3 is a schematic view of a system and process for manufacturing a laminate material.

Reference is next made to FIG. 3, which illustrates an example system 300 for assembling laminate material 100 in a continuous manufacturing process. System 300 includes a first non-woven layer unwind roll 302, a second non-woven layer unwind roll 304, an elastic element unwind roll 306 and a pair of reinforcing element unwind roll 308 and 309 (which is hidden behind unwind roll 308 in FIG. 3). A roll of the corresponding material, element or layer is placed on each of the unwind rolls and is drawn from the roll as the laminate material is formed.

System 300 also includes adhesive spray heads 324, 325 and 326. In the operation of system 300, laminate material 100 is continuously assembled with the various components of the laminate material traveling in the machine direction 114 as they are drawn from their respective unwind rolls.

The apparatus 300 (for example) can be used to make the laminate material 100 according to a method as follows. Elastic element 106 can be drawn from unwind roll 306 and adhesive 124 is sprayed onto elastic element 106 by adhesive spray head 324. Non-woven layer 102 and elastic element 106 are pressed by pressure rollers 330a and 330b, bonding them together with adhesive 124. In this embodiment, adhesive 124 is not sprayed over the entire width of the elastic element 106. Instead, edge margins 136 (FIG. 2) are provided free of adhesive 124. Leaving the edge margins 136 of the elastic element 106 free of adhesive can reduce overspray onto the components of system 300. Alternatively, adhesive 124 may be sprayed to the edges 106a, 106b of elastic element 106, which can in some embodiments help to ensure that the elastic element 106 is bonded to the first non-woven layer 102 across the width of the elastic element.

Reinforcing elements 108 and 109 are drawn from their respective unwind rolls 308 and 309 and adhesive 126 is sprayed onto them using adhesive spray heads 326. The reinforcement elements 108 and 109 are bonded to non-woven layer 102 and to elastic element 106 by pressing them together through pressure rollers 332a and 332b. In this embodiment, an edge margin 140 free of adhesive 126 is provided at the cross direction edges of the laminate material as well as at the inboard edges 108a, 109a of the reinforcing elements 108, 109. In the overlap regions 128 and 130, the reinforcing elements are adhered to elastic element 106 with adhesive 126.

The second non-woven layer 104 is drawn from its unwind roll 304 and adhesive 125 is sprayed onto the non-woven layer 104 using adhesive spray head 325. The second non-woven layer 104 is bonded to the reinforcing elements 108 and 109 and to the elastic element 106 by pressing them together through pressure rollers 334a and 334b.

Figure 4:
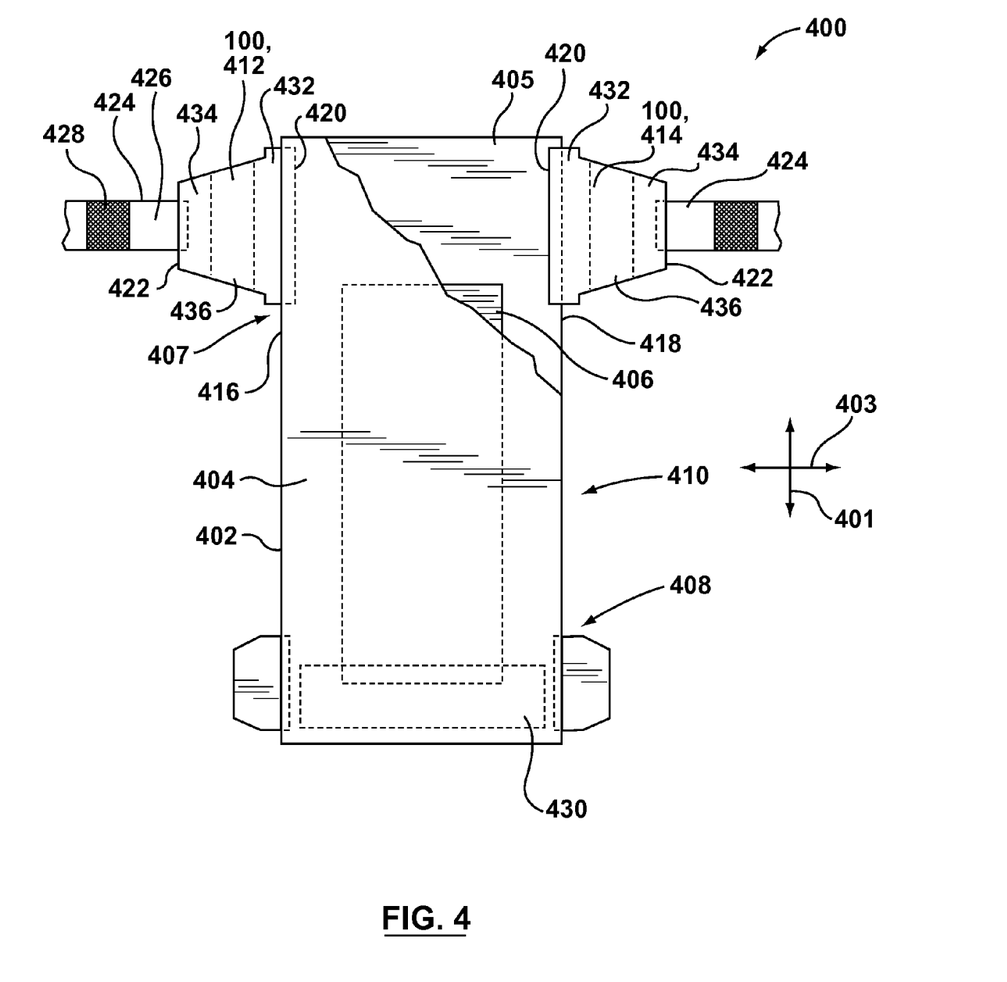
FIG. 4 is a top view of a diaper including an ear comprising the laminate material of FIG. 1.

Reference is next made to FIG. 4, which illustrates an exemplary diaper 400 incorporating the stretch laminate material 100. Diaper 400 has a central chassis 402 that includes a liquid permeable topsheet 404, a liquid impermeable backsheet 405 and an absorbent core 406 sandwiched between the topsheet and backsheet. The illustrated diaper 400 has a rectangular chassis 402. In alternative embodiments the chassis of the diaper may have an hourglass shape or may have one or more contoured sides or may have any other shape. The diaper 400 has a longitudinal or machine direction 401 and a transverse or cross direction 403.

The chassis 402 has a rear waist region 407 and a front waist region 408 separated by a central region 410. Each one of a pair of ears 412 and 414 is mounted to a respective outboard side edge 416 and 418 of the rear waist region 407. Ears 412 and 414 are cut from laminate material 100. Each ear has a proximal non-elastic region 432, a distal non-elastic region 434 and an elastic region 436 disposed between the proximal and distal non-elastic regions. In each ear, the proximal non-elastic region corresponds to one of the first or second non-elastic regions 110, 111 in stretch laminate material 100, the distal non-elastic region corresponds to the other one of the first or second non-elastic region 110, 111 in the stretch laminate material and the elastic region 436 corresponds to the elastic region 106 of the stretch laminate material 100.

Ear 412 has a proximal edge 420 that is mounted to chassis 402 adjacent outboard edge 416. Ear 412 also has a distal edge 422 to which a tab 424 is mounted. Tab 424 includes a base layer 426 that is bonded to the distal edge 422 of the ear 412. Tab 424 also includes a fastening element 428 that cooperates with a complementary fastening element 430 on the exterior of the front waist region 408 of the diaper 400 to allow the diaper to be fastened on a wearer when the diaper is in use.

Ear 414 similarly has a proximal edge 420 mounted to the chassis of diaper 400 and a distal edge 422 to which a tab 424 is mounted.

Figure 5A:
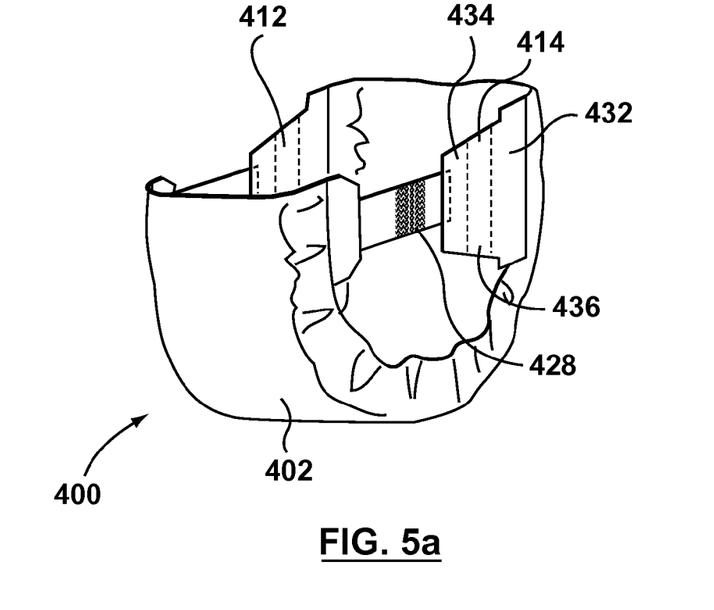
FIGS. 5a and 5b are perspective view of the diaper of FIG. 4 prior to and after, respectively, the diaper being fastened on a wearer.
Figure 5B:
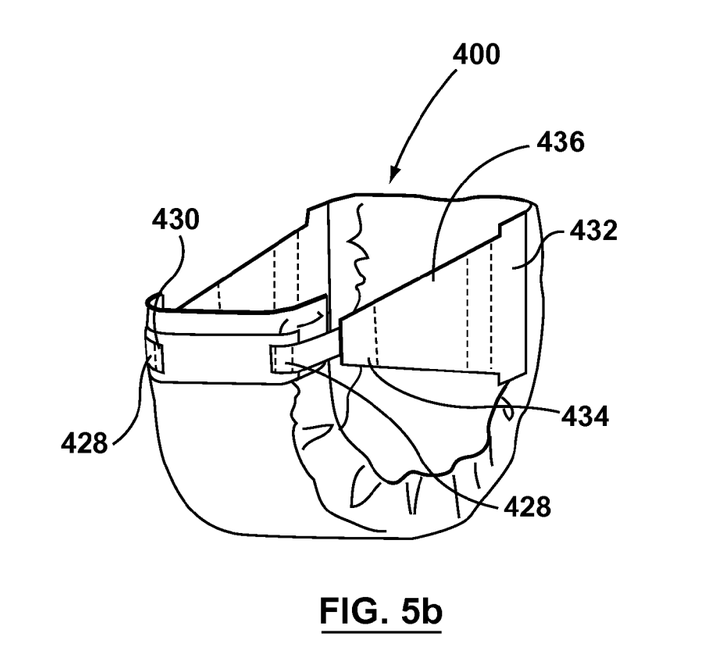

Reference is next made to FIGS. 5a and 5b. FIG. 5a illustrates diaper 400 prior to placing it on a wearer. FIG. 5b illustrates diaper 400 in its configuration when worn by a wearer (who is not illustrated). Typically, diaper 400 will be worn by a child and will be placed on the child by a parent or other caregiver. To fasten the diaper 400 on the child, the caregiver can lay the child on the open diaper 400 (FIG. 4) with the rear waist region 407 of the child's lower back, and the front waist region 408 between the child's legs. The front waist region 408 can be pulled through the child's legs to overlie the child's lower tummy. The caregiver can then grasp the tab 424 and pull the ears 412 and 414 in the cross direction 116 of the ears with sufficient force to extend the ears by stretching the elastic region 436 of the ear (i.e. by extending the cross-directional extent of the laminate 100 between the overlap regions 128 and 130).

This stretching of the elastic region 436 of the ears 412, 414 (i.e. elastic region 112 of the laminate 100) effects a first cycle stretch of the laminate 100 that strains the non-woven layers 102, 104. The weakening of the central regions of the non-woven layers 102, 104 facilitates the straining of the non-woven layers 102, 104 when the ears 412, 414 are stretched for the first time. In the example illustrated, the nonwovens are weakened in the cross direction by carding in the machine direction, providing nonwoven layers in which cross direction inter-fiber bonds of the non-woven layers can be broken relatively easily, allowing the non-woven layers to be extended more easily. The caregiver is able to extend the elastic regions 436 of the ears 412 and 414 of the example illustrated with less force than if the non-woven layers 102 and 104 were not carded.

Once the elastic region 436 of the ears have been extended, the caregiver affixes the fastening element 428 onto the complementary fastening element 430. When the diaper has been fastened in this fashion, the elastic element 106 in the elastic region 436 of the ears 412 and 414 provides tension in the elastic region.

The reinforcement elements 108, 109 substantially prevent extension of the non-elastic regions 432 and 434 of the ear 412, thereby ensuring that the non-woven layers 102 and 104 do not tear when the ear is stretched by caregiver and subsequently when the diaper is in use on a child.

By bonding the reinforcement elements 108 and 109 with the elastic element 106 in the overlap regions 128, 130 the tensile force applied to the ears 412 or 414 when the diaper 400 is installed on a child is applied through the reinforcing elements 108, 109 to the elastic element 106 between the overlap regions 128 and 130. As can be understood with reference to FIG. 2a, the laminate 100 (in its thickness) includes at least one of the reinforcing elements 108, 109 or the elastic member 106 in addition to the nonwoven layers 102, 104 anywhere along its width between the distal edges 108b, 109b. Thus the cross direction strength of the laminate does not at any point rely only on the highly extensible, but cross-directionally weak, non-woven layers 102, 104, and so rupture or tearing apart of the laminate 100 is generally inhibited.

In other embodiments of a stretch laminate material, the non-elastic regions may include different reinforcement elements 108, 109. For example, the non-woven layers may be bonded together with an adhesive between them in a bilaminate construction. The interfiber bonds between the carded non-woven layers are enhanced by the adhesive layer between the non-woven layers and the adhesive functions as a reinforcement element. To manufacture a stretch laminate material according to this embodiment, an adhesive is applied to adhesive element, which is then bonded to the first non-woven layer. The reinforcement element adhesive is then applied to the second non-woven layer (or to the first non-woven layer) and the two non-woven layers are bonded together with the elastic element sandwiched between them.

In another embodiment, an oriented fiber adhesive may be used as the reinforcement element 108, 109. The adhesive is disposed in fibers oriented in the cross-direction to enhance the cross-direction reinforcement provided by the adhesive. During manufacturing, the reinforcement adhesive may be laid in strands generally in the cross-direction or may be blown onto the first or second non-woven layer so that it is generally oriented in cross-directions fibers or strands.

In another embodiment of a stretch laminate material, the non-woven layers may not be carded in the machine direction. The non-woven is selected or configured such that the inter-fiber bonds between fibers in the non-woven layers, at least in the elastic region, are sufficiently weak to allow a caregiver to stretch the laminate in the elastic region.

Figure 6:
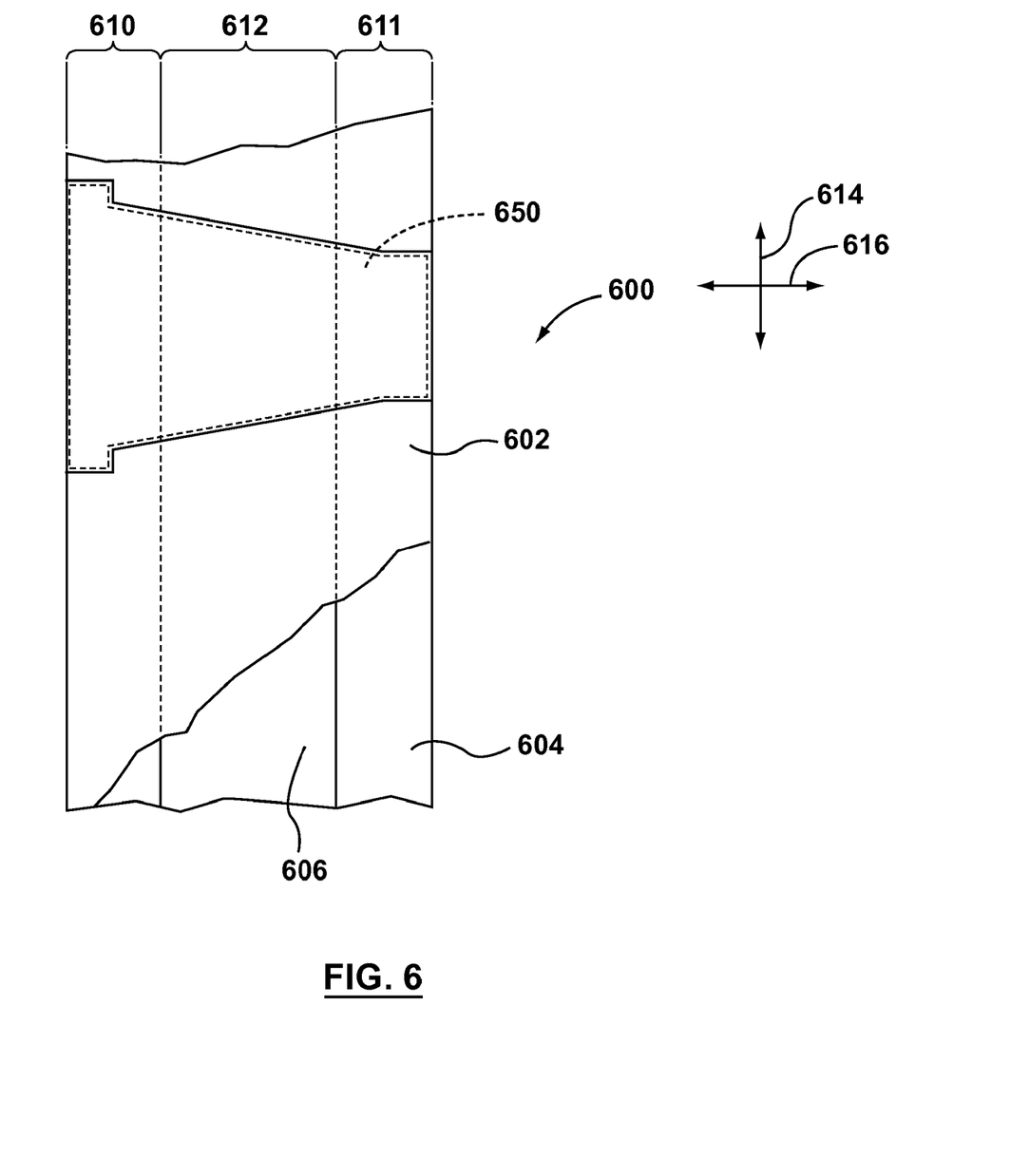
FIGS. 6 and 7 illustrate additional embodiments of stretch laminate materials.

Reference is next made to FIG. 6, which illustrates a second embodiment of a stretch laminate material 600. Elements of stretch laminate material 600 that correspond to elements of stretch laminate material 100 are identified with similar reference numerals, incremented by 500. Stretch laminate material 600 includes first and second non-woven layers 602 and 604. Stretch laminate material 600 has an elastic element 606 sandwiched between the non-woven layers 602, 604 in an elastic region 612. Elastic region 612 is transversely disposed between first and second non-elastic regions 610 and 611. First and second non-woven layers 602, 604 are bonded together across the non-elastic regions 610, 611 and may be bonded together with an adhesive. The non-woven layers are modified to reinforce them in the cross direction 616. In this embodiment, the non-woven layers 602, 604 are embossed across the non-elastic region 610, 611 following assembly of the non-woven layers 602, 604 and the elastic element 606. Embossing the non-woven layers can increase the interfiber bonds within each of the non-woven layers allowing the non-woven layer to resist tearing in the machine direction 614 when a cross direction force is applied to an ear cut (illustrated by dotted-line region 650) from the stretch laminate material 600.

In other embodiments, the non-woven layers may be reinforced by hydroentangling or by needlepunching fibers within the non-woven layers such that they become intermeshed with one another and have a stronger interfiber coupling (which may be a physical entangling in addition to any bonding between the fibers resulting form the manufacturing of the non-woven layer). These processes may also be used to entangle fibers in one or both of the non-woven layers with fibers in the other non-woven layer, which may further enhance the resistance of the non-elastic regions to tearing.

In other embodiments, the non-elastic regions may be reinforced by thermal bonding (with or without the use of a pressure or calendar roll) heating the non-woven layers in the non-elastic regions such that the fibers within the non-woven layers melt and form stronger bonds with one another and with fibers in the other non-woven layer. In other embodiments, the non-elastic regions may be reinforced by ultrasonic bonding (which is a form of thermal bonding). The embossing of the non-elastic regions in laminate 600 can comprise another example of thermal bonding.

The non-elastic regions may be reinforced across their entire area or may be reinforced at discrete or localized areas, lines, or at particular points, such as, for example, with a point bonding or embossing process. The reinforcement of the non-elastic regions may reinforce one or both non-woven layers individually or may reinforce the non-elastic region by bonding (thermally or mechanically) the non-woven layers to one another. The reinforcement may also operate on one or both non-woven layer separately and on the non-woven layers together.

Laminate 600 and the variations described above involve reinforcement of the non-elastic regions after the laminate 600 has been assembled. Alternatively, or in addition, the non-woven layer could be reinforced prior to assembly with an elastic element such that the non-woven layers are reinforced in at least the non-elastic regions of the finished laminate.

In another embodiment, the non-woven layers may be processed (before or after assembly with the elastic element) to reinforce them, and a reinforcement element may also be provided in the non-elastic regions.

Figure 7:
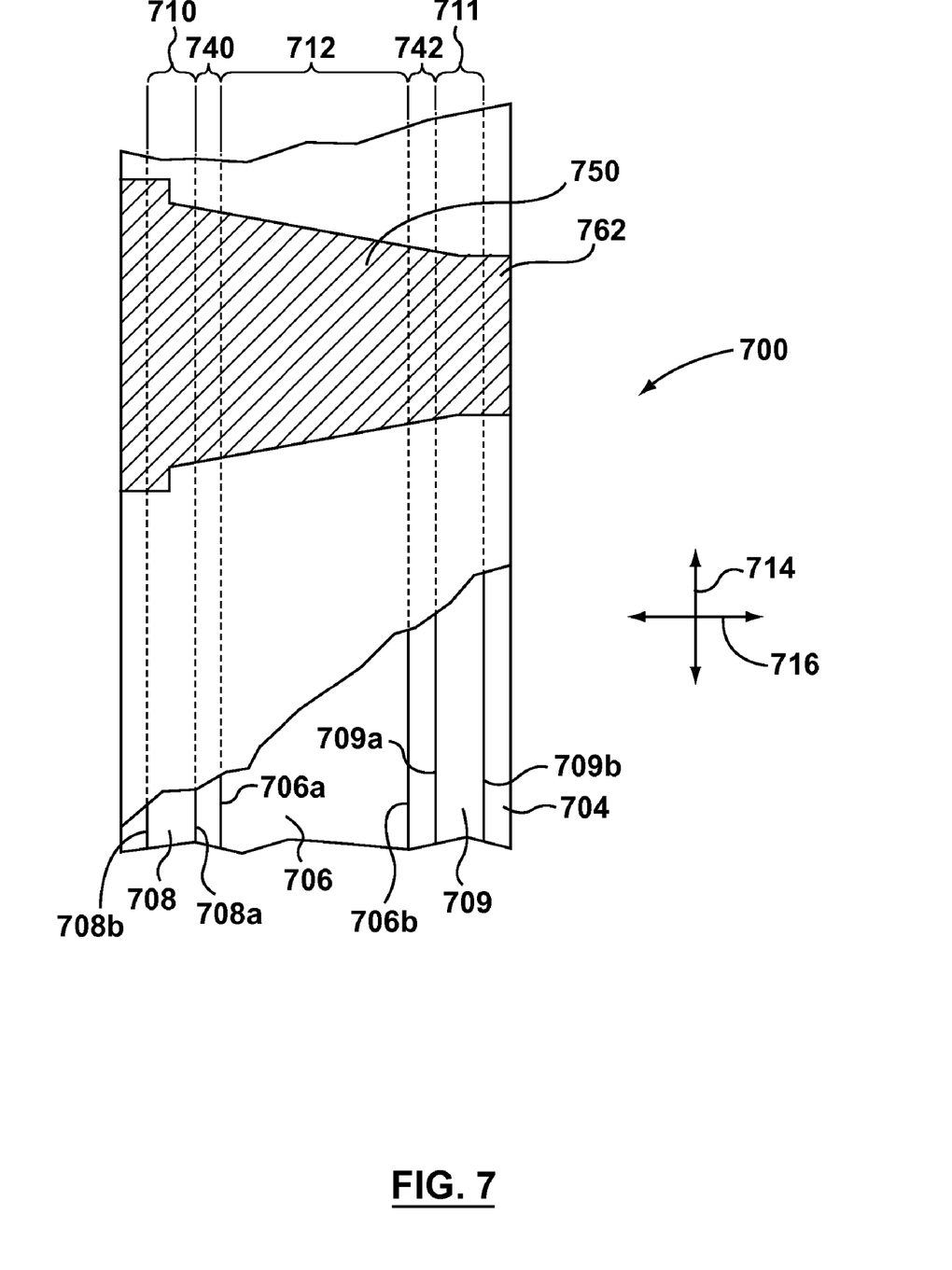

Reference is next made to FIG. 7, which illustrates another stretch laminate material 700. Elements of stretch laminate 700 that correspond to stretch laminate material 100 are identified by similar reference numerals, incremented by 600. Stretch laminate material 700 includes first and second non-woven layers 702 and 704. An elastic element 706 and reinforcement elements 708 and 709 are sandwiched between the non-woven layer 702 and 704. The first and second non-woven layers 702 and 704 are formed of a carded non-woven material.

Laminate 700 has an elastic region 712 disposed between first and second non-elastic regions 710 and 711.

The elastic region 712 is spaced apart from the first and second non-elastic regions by gap regions 740 and 742. Neither the elastic element 706 or the reinforcement elements 708 and 709 extend into the gap regions.

The non-woven layers 702 and 704 are carded with their fibers oriented to some degree in the machine direction 716 of the laminate. To prevent the non-woven layers from tearing in the machine direction in the gap regions when a cross-direction force is applied to a diaper ear cut (illustrated in shaded region 750) from laminate material, the non-woven layers are reinforced between the elastic region 712 and the non-elastic regions 710 and 711. In this embodiment, the non-woven layers are embossed in at least the gap regions 740, 742 after the components of laminate 700 are assembled together. Alternatively, the gap regions could be reinforced in any of the manners discussed above in relation to laminate 600 for reinforcing the non-elastic regions 610, 611. In other embodiments, the non-woven layers may be reinforced prior to assembly with the elastic element 706 and the reinforcement elements.

In other embodiments, the edges 706a, 706b of the elastomeric element 706 can abut the proximal edges 708a, 709a, respectively of the reinforcing members so that neither a gap region nor an overlap region are provided therebetween. The outboard edges of the nonwoven layers 702, 704 can, in some examples, be positioned inboard of the distal edges 708b, 709b of the reinforcement members 708, 709.

In other embodiments of a stretch laminate, the elastic element may be extrusion bonded with one or both of the non-woven layers. Optionally, an adhesive may be applied to assist the bond between an elastic element and a non-woven layer to which the elastic element is extrusion bonded.

The present invention has been described here by way of example only. Various modification and variations may be made to these exemplary embodiments without departing from the spirit and scope of the invention.

Example

A laminate 100 has a construction generally as described in FIG. 1. The nonwoven layers 102, 104 are of a 21 gsm carded non-woven, uniform across its width. The elastic element 106 is in the form of an elastomeric film adhesively bonded to the nonwoven layers 102, 104. The reinforcement members 108, 109 are a non-carded non-woven of about 30 gsm. The cross-directional extent of the elastic region 112 (i.e. the spacing between the edges 108b and 109b is about 5 cm.

On the first cycle extension (during which the central regions of the non-woven layers are strained), a load of about 20-22 N is applied across the width of the laminate 100, causing no cross-direction extension of the inelastic regions 110, 111, and causing a 150% elongation in the cross-direction of the elastic region 112 (i.e. causing the 5 cm distance to extend to about 12.5 cm). On the second cycle, a force of about 10-12N is applied across the laminate 100 to achieve an equal extension (about 150%) as for the first cycle.

The first cycle force is that which actually strains the highly extensible, non-reinforced region of the carded nonwovens 102, 104 of the example illustrated. During subsequent cycles, the nonwoven layers 102, 104 generally offer no resistance to a force re-extending the laminate to the extension reached in the first cycle. By providing a highly extensible non-woven, the first cycle force required to achieve 150% extension of the elastic region 112 is not more than about twice that as required for the second cycle. In the third and subsequent cycles, the laminate 100 behaves similar as the first cycle.

We claim:

1. A stretch laminate material, comprising:
a carrier web extending in width in a lateral direction between opposed side edges and lengthwise in a longitudinal direction normal to the width, the carrier web having at least one extensible zone in which the carrier web can be extended in the lateral direction by hand, and at least one inextensible zone positioned laterally beside the extensible zone and in which the carrier web is substantially inextensible in the lateral direction, and an elastomeric layer joined to the carrier web and overlying at most a first one of the side edges of the carrier web and at least a portion of the extensible zone, wherein at least a portion of the inextensible zone is disposed laterally between a second one of the side edges of the carrier web and the elastomeric layer, the elastomeric layer being elastically stretchable in the lateral direction.

2. The stretch laminate material of claim 1, wherein the carrier web comprises a nonwoven layer.

3. The stretch laminate material of claim 2, wherein in at least the extensible zone, the nonwoven layer comprises fibers generally oriented in the longitudinal direction.

4. The stretch laminate material of claim 3, wherein the carrier web comprises a reinforcement layer joined to the nonwoven layer and overlying the inextensible zone.

5. The stretch laminate material of claim 4, wherein the extensible zone is substantially clear of the reinforcement layer.

6. A stretch laminate material, comprising:
a) a generally inelastic nonwoven base layer, the nonwoven base layer including fibers generally oriented in a longitudinal direction providing the nonwoven base layer with relatively higher tensile strength in the longitudinal direction and relatively lower tensile strength in a lateral direction normal to the longitudinal direction;

b) a pair of reinforcement members, each having a higher tensile strength in the lateral direction than that of the nonwoven base layer, each reinforcement member extending lengthwise of the nonwoven base layer, each reinforcement member having a laterally distal edge adjacent a respective side edge of the nonwoven base layer, and a laterally proximal edge opposite the distal edge and positioned laterally inwardly of the distal edge, the respective proximal edges being spaced apart laterally providing a laterally central zone of the nonwoven base layer free of the reinforcement members; and c) a laterally stretchable elastomeric layer joined to the nonwoven base layer and generally overlying the laterally central zone of the nonwoven base layer, the elastomeric layer having opposing sides edges spaced apart in the lateral direction, each side edge of the elastomeric layer is disposed laterally intermediate the proximal and distal edges of one reinforcement member providing overlapping seams between the elastomeric layer and each reinforcement member.

7. The stretch laminate material of claim 6, further comprising an upper nonwoven layer generally co-extensive with the nonwoven base layer and overlying the elastomeric layer and the reinforcement members.

8. A diaper comprising a chassis with ears extending laterally outwardly therefrom, at least one of the ears comprising a stretch laminate as claimed in claim 6.

9. The stretch laminate material of claim 6, wherein the distal edge of a first one of the reinforcement members is disposed laterally intermediate one side edge of the elastomeric layer and the respective side edge of the nonwoven base layer.

10. A stretch laminate material comprising:

a) a carrier web having a carrier width extending between opposing first and second carrier side edges spaced apart in a lateral direction, and a length extending between opposing ends spaced apart in a longitudinal direction normal to the lateral direction;

b) an elastomeric layer joined to the carrier web, the elastomeric layer having an elastomeric width extending between corresponding first and second elastomeric side edges spaced apart in the lateral direction, the elastomeric width being less than the carrier width and the first elastomeric side edge being spaced laterally intermediate the first and second carrier side edges; and c) the carrier web having at least one extensible zone, overlying at least a portion of the elastomeric layer, in which the carrier web can be extended in the lateral direction by hand, and at least one inextensible zone overlying a portion of the elastomeric layer and comprising at least a portion of the carrier web extending laterally between the first elastomeric edge and the first carrier edge, in which the carrier web is substantially inextensible in the lateral direction by hand.

11. The stretch laminate material of claim 10, wherein the carrier web comprises a non-woven layer having fibers generally oriented in the longitudinal direction.

12. The stretch laminate material of claim 10, further comprising a reinforcement layer positioned in the inextensible one and joined to the carrier web and the elastomeric layer, the reinforcement layer having a proximal side edge overlying the elastomeric layer and an opposing distal side edge spaced apart from the proximal side edge in the lateral direction and the first elastomeric side edge being laterally intermediate the proximal and distal edges.

13. The stretch laminate material of claim 12, wherein the distal side edge of the reinforcement layer is laterally intermediate the first elastomeric edge and the first carrier edge.

14. The stretch laminate material of claim 12, wherein the carrier web comprises a non-woven layer having fibers generally oriented in the longitudinal direction in at least a portion of the extensible zone.

15. The stretch laminate material of claim 10, wherein the at least one inextensible zone comprises first and second inextensible zones positioned on laterally opposite sides of the at least one extensible zone.

* * * * *